United States Patent [19]
Morris

[11] 3,910,634
[45] Oct. 7, 1975

[54] CHILD'S SAFETY SEAT

[75] Inventor: Anthony R. Morris, New Duston, England

[73] Assignee: Universal Oil Products Company, Des Plaines, Ill.

[22] Filed: May 7, 1974

[21] Appl. No.: 467,752

[30] Foreign Application Priority Data
May 8, 1973  United Kingdom................ 21816/73
Feb. 5, 1974  United Kingdom.................. 5153/74

[52] U.S. Cl. ................. 297/384; 297/250; 297/390
[51] Int. Cl.² ......................................... A62B 35/00
[58] Field of Search ...... 297/DIG. 1, 384, 390, 410, 297/391, 250, 254, 255, 256, 377, 232, 427, 445, 452, 458; 220/21

[56] References Cited
UNITED STATES PATENTS

| | | | |
|---|---|---|---|
| 3,031,229 | 4/1962 | Symbalsk | 297/390 |
| 3,160,306 | 12/1964 | Smalley | 220/21 X |
| 3,325,213 | 6/1967 | Levy | 297/250 |
| 3,341,251 | 9/1967 | Costin | 297/DIG. 2 |
| 3,351,380 | 11/1967 | Sprague | 297/377 |
| 3,547,489 | 12/1970 | Grieser | 297/385 |
| 3,663,057 | 5/1972 | Lohr | 297/DIG. 1 |
| 3,669,496 | 1/1972 | Chisholm | 297/DIG. 2 |
| 3,709,558 | 1/1973 | Jakob | 297/250 |
| 3,761,126 | 9/1973 | Mulholland | 297/391 X |
| 3,767,259 | 10/1973 | Blake et al. | 297/390 |
| 3,858,936 | 1/1973 | Gerkin | 297/377 |

*Primary Examiner*—James T. McCall
*Attorney, Agent, or Firm*—James R. Hoatson, Jr.; Barry L. Clark; William H. Page, II

[57] ABSTRACT

Child's safety seat for use in a vehicle has spaced apart front and rear walls which abut each other and are joined together at selected positions. A plurality of slots formed at certain of the abutment positions are adapted to receive the straps of a body harness. The child's seat is adapted to be restrained at upper and lower portions of its rear surface by mounting straps attached to the vehicle. The shoulder straps of the harness are anchored to a rod which may be positioned in various sets of vertical slots depending upon the size of the child. Similarly, a head rest can be positioned in a plurality of vertical positions.

16 Claims, 4 Drawing Figures

CHILD'S SAFETY SEAT

This invention relates to seats and in particular to a child's seat for use in a motor vehicle and intended to be mounted on an existing passenger seat of the vehicle and supported thereon by seat mounting straps attached to anchorage points on the vehicle.

According to the present invention there is provided a child's seat for mounting in a vehicle, the seat comprising a seat shell molded in plastics material and having a forward wall and a rearward wall which adjoin to define a closed hollow walled structure, the two walls also abutting together around slots formed through said walls, a body harness comprising straps which extend through said slots, a buckle for interconnecting said straps at one end thereof, means for securing the opposite ends of said straps, and mounting straps for mounting said seat on the vehicle, said mounting straps including two lower straps secured to the seat adjacent the lower end of the back of the seat and two upper straps secured to the seat on an upper part of the back of the seat.

Preferably, the forward wall and the rearward wall are formed at selected positions with recessed portions which abut and are bonded to one another, the abutting portions of the walls having strap receiving slots therein, some of said recessed portions being corrugated and the corrugated portions fitting one within another to strengthen the structure and receive therein retaining means for receiving the ends of certain of said straps.

One form of child's seat in accordance with the invention will now be particularly described, by way of example, with reference to the accompanying drawings in which.

Figure 1:
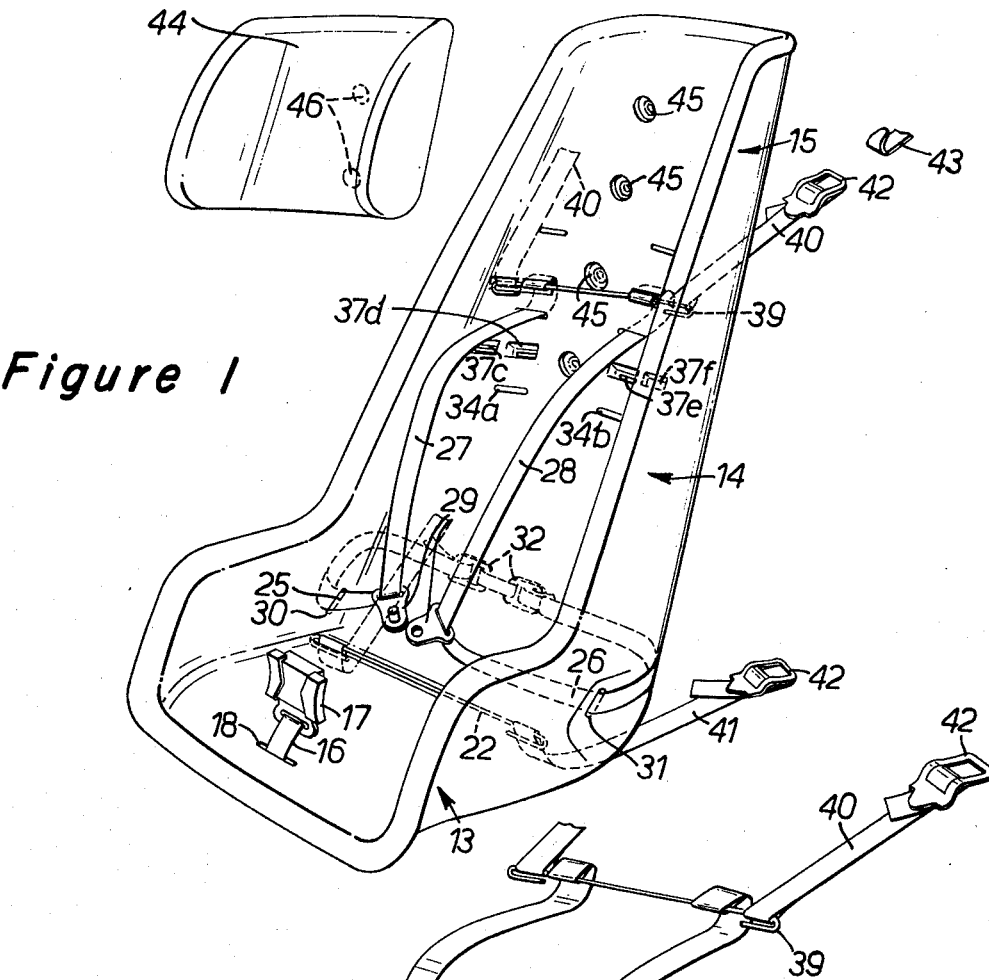
FIG. 1 is a front perspective view of the child's seat showing a body harness in the released state and mounting straps for mounting the seat in a vehicle.
Figure 2:
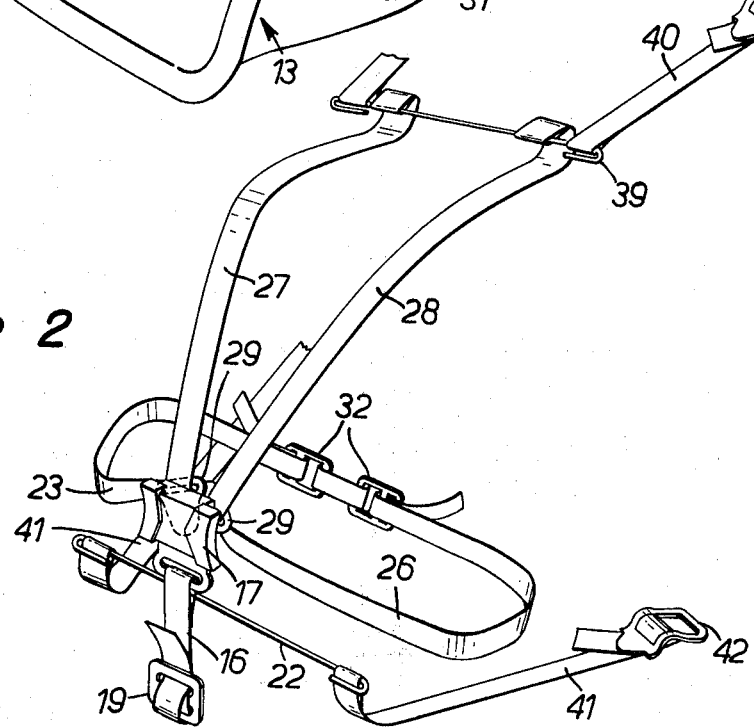
FIG. 2 is a spatial view of the harness and mounting straps.

As shown in the drawings, the main component of the child's seat is a seat shell 10 which, for high strength/weight ratio, is formed in a hollow-walled construction. This can be produced by forming two complementary shell members by injection molding, each having a peripheral flange such that the two shell members can be fitted together with the flange of one abutting, or lying closely within, the flange of the other. Alternatively the hollow-walled seat shell can be made in one piece by blow molding.

In either method of construction, the front and back shell members 11, 12, which form the forward wall and rearward wall of the shell, are caused to abut, or kiss together, over selected portions of the seat shell and in particular where the seat shell is slotted to provide high strength in these regions and enable the slots to receive, and take the load of, the body harness. In the case of an injection-molded seat, the flanges and the kissed portions of the shell members can be joined together by heating or by adhesive, whereas in the case of a blow molded shell, the kissed portions will be brought together and will bond to one another during the blow molding of the seat.

As will be seen from the drawings, the seat shell is of a bucket-type configuration comprising integral seat, back and headrest portions 13, 14, 15 respectively and shaped to fit around the hips and back of the child, the wrap-around configuration being designed to give good lateral support.

Figure 3:
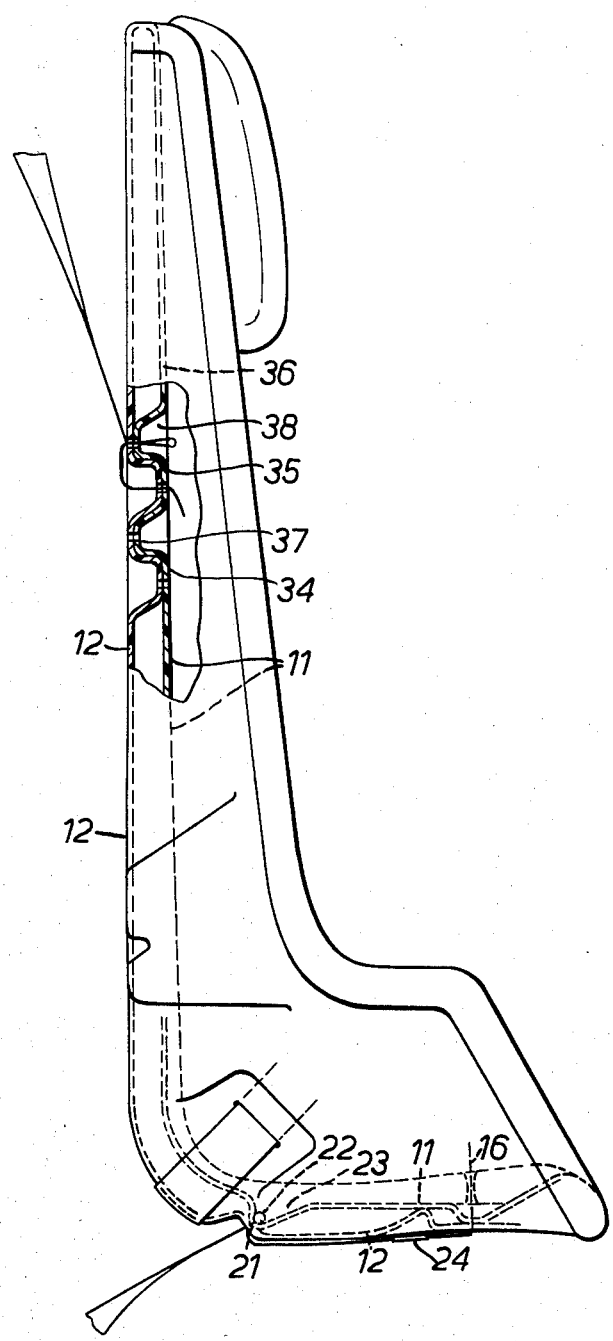
FIG. 3 is a side elevation of the seat of FIG. 1.
Figure 4:
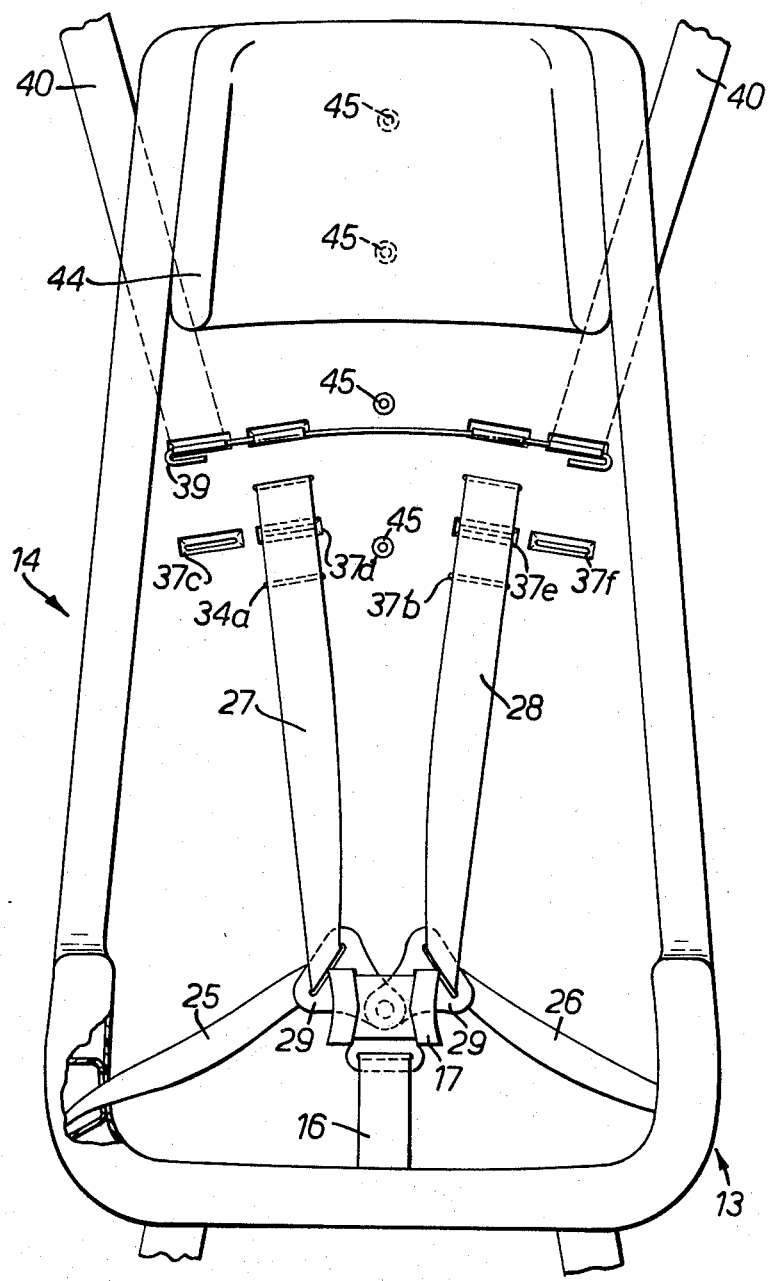
FIG. 4 is a front elevation of the seat of FIG. 1.

The body harness is formed in three parts. One part comprises a crotch strap 16 designed to extend downwardly from a quick release buckle 17 located near the abdomen of the seat occupant, the crotch strap passing freely through a laterally extending horizontal slot 18 in the bottom of the seat shell. The end of the crotch strap on the underside of the seat can be threaded through a friction buckle 19 which is too large to be pulled through the slot. Alternatively, as indicated in FIG. 3, the crotch strap 16 can pass along the underside of the seat and forwardly through a slot 21 at the junction of the back part and seat part of the seat shell. At this junction, the front and back shell members 11, 12 are recessed and a rod 22 is received in the recess 23 of the front shell member 11. The crotch strap is looped around a central part of this rod and is returned via the slot 21 to a friction buckle 24 on another part of the same strap. In either way of securing the crotch strap, movement of the buckle along the strap will shorten or lengthen the strap.

The other parts of the harness comprise two waist straps 25, 26, and two shoulder straps 27, 28, integral with the respective waist straps, each shoulder/waist strap slidingly supporting a separate one of two apertured plates 29 adapted to be pushed into the buckle 17 and locked therein by a spring-biassed pin (not shown) in the buckle.

The waist straps pass outwardly through respective slots 30, 31 on opposite sides of the seat adjacent the hips of the seat occupant, each strap being threaded through a separate one of two interconnected friction buckles 32 to lock the strap within the buckle by friction. The effective length of the waist straps and hence also of the shoulder straps can be adjusted by adjustment of the positions of the buckles on these straps.

The front or back shell members in the upper part of the back of the seat are formed with horizontally-extending corrugations which fit into one another and provide a particularly strong region for securing the shoulder straps and an upper pair of seat mounting straps 40. On the forward side of the seat, the corrugations conveniently present three horizontally-extending crests 34, 35, 36, each formed with two horizontally-spaced slots such as 34a, 34b, and two intervening troughs 37, 38 each formed with four horizontally-spaced slots such as 37c, 37d, 37e, 37f. Disposed in one of these troughs is a rod 39, and the shoulder straps which pass rearwardly through the two slots on one of the adjacent crests, are brought back to the front of the seat through the inner two of the four slots in the trough containing the rod 39, the shoulder straps terminating in loops through which the rod extends. The upper mounting straps 40 pass forwardly through the outer two slots and also terminate in loops through which the rod 39 extends. The ends of the rod are preferably bent to prevent the loops from inadvertently slipping off the rod.

By the provision of two troughs into which the rod can be fitted selectively, and three corresponding crests, it will be evident that the upper seat mounting straps can be fitted to the seat selectively at two different heights depending on the trough into which the rod is fitted. Similarly, the shoulder straps can pass through the back of the seat selectively at three different heights depending on the height of the crest which contains the selected slots through which the shoulder straps pass.

The child's seat is mounted on a seat of the vehicle by the upper pair of mounting straps 40 and a lower pair of mounting straps 41 which are secured at their rearward ends by buckles 42 to hooked anchorage plates 43 fixed to the vehicle. Conveniently the anchorage plates will be on the floor or other rigid part of the vehicle. The mounting straps are preferably made of variable length by looping the straps through the buckles in a manner similar to the waist straps.

The seat is provided with a padded headrest 44 and four vertically spaced attachments 45 on the back of the seat cooperate with two mating attachments 46 on the headrest to enable the headrest to be fitted in any one of three vertically spaced positions.

The seat can be provided with fixed upholstery or removable upholstery or can be produced without upholstery.

What I claim is:

1. A child's seat for a vehicle, comprising a bucket-type seat shell molded in plastics material and having a forward wall and a rearward wall joined together to define a closed hollow-walled structure having back, bottom and side wall portions, the walls also abutting together at selected positions, some abutting portions of the walls having slots therein forming openings through the seat for the reception of straps of a body harness and for the reception of mounting straps.

2. A child's seat according to claim 1 wherein the two walls have been brought together after molding.

3. A child's seat according to claim 1 wherein the seat shell has been blow-molded.

4. A child's seat according to claim 1 including two upper mounting straps which pass through slots in an upper part of the seat and an additional two lower mounting straps which pass through slots in a lower part of the seat.

5. A child's seat for mounting in a vehicle, the seat comprising a seat shell molded in plastics material and having a forward wall and a rearward wall which adjoin to define a closed hollow walled structure having back, bottom and side wall portions, the two walls also abutting together around slots formed through said walls, a body harness comprising straps which extend through said slots, a buckle for interconnecting said straps at one end thereof, means for securing the opposite ends of said straps, and mounting straps for mounting said seat on the vehicle, said mounting straps including two lower straps secured to the seat adjacent the lower end of the back of the seat and two upper straps secured to the seat on an upper part of the back of the seat.

6. A child's seat according to claim 5 wherein said two lower mounting straps are attached to rigid retaining means disposed at the bottom of the back of the seat and supported by the forward surface of said forward wall.

7. A child's seat according to claim 5 wherein said two upper mounting straps are attached to rigid retaining means disposed on an upper part of the back of the seat and supported by the forward surface of said forward wall.

8. A child's seat according to claim 7 wherein said retaining means comprises a metal rod extending transversely of the seat and disposed in a recess in said forward wall located at at least one of said slots for at least the portion of its length wherein it has said mounting straps attached to it.

9. A child's seat according to claim 5 wherein said harness comprises two waist straps extending through slots in the opposite side wall portions of the seat, two shoulder straps extending through slots in an upper part of the back portion of the seat, and a crotch strap extending through a slot in the bottom portion of the seat.

10. A child's seat according to claim 9 wherein the ends of the waist straps remote from the buckle are joined together behind the seat.

11. A child's seat according to claim 9 wherein each waist strap is integral with one of said shoulder straps.

12. A child's seat according to claim 9 wherein the crotch strap and said two lower mounting straps are secured to a common retaining means in the seat.

13. A child's seat according to claim 1 wherein the forward and rearward walls of the seat shell are formed with corrugations adjacent at least some of said slots, the corrugations of the two walls fitting one within another and being bonded together to strengthen the structure in the vicinity of said slots.

14. A child's seat according to claim 1 having a detachable headrest and means for selectively attaching the headrest to the forward surface of the back wall portion of the seat shell at two or more positions thereon.

15. A child's seat for mounting in a vehicle, the seat comprising a hollow-walled plastics-molded seat shell having a forward wall and a rearward wall defining back, bottom and side wall portions which at selected positions are formed with recessed portions which abut and are bonded to one another, the abutting portions of the walls having slots therein, and straps which extend through said slots, some of said recessed portions being corrugated and the corrugated portions fitting one within another to strengthen the structure and receive therein retaining means for receiving the ends of certain of said straps.

16. A child's seat according to claim 1 having pairs of horizontally-spaced slots located at different heights on the upper portion of the seat for selectively retaining the harness straps or upper mounting straps or both said harness and mounting straps at different heights on the upper portion of the seat.

* * * * *